(No Model.) 3 Sheets—Sheet 3.
A. KIRK.
DAM.
No. 439,522. Patented Oct. 28, 1890.
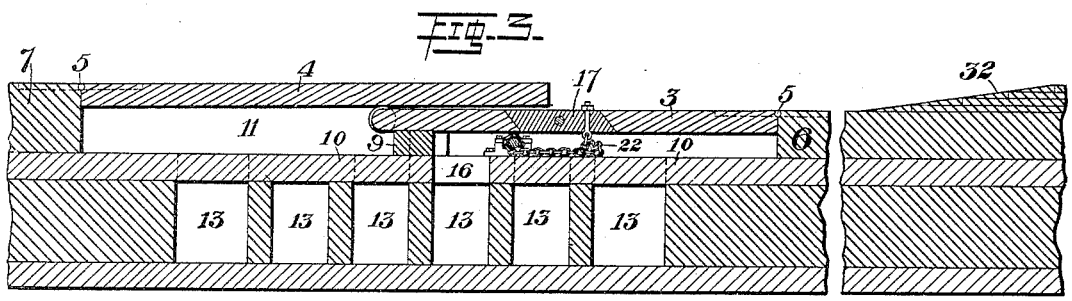
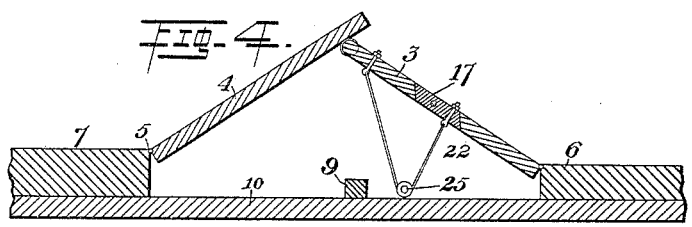
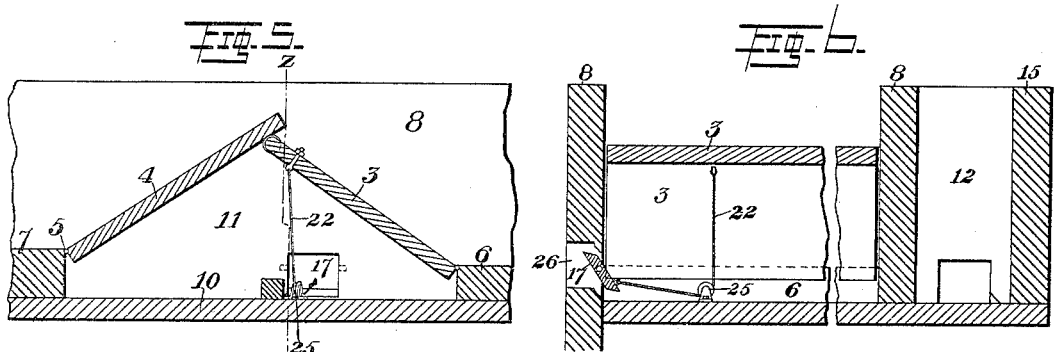
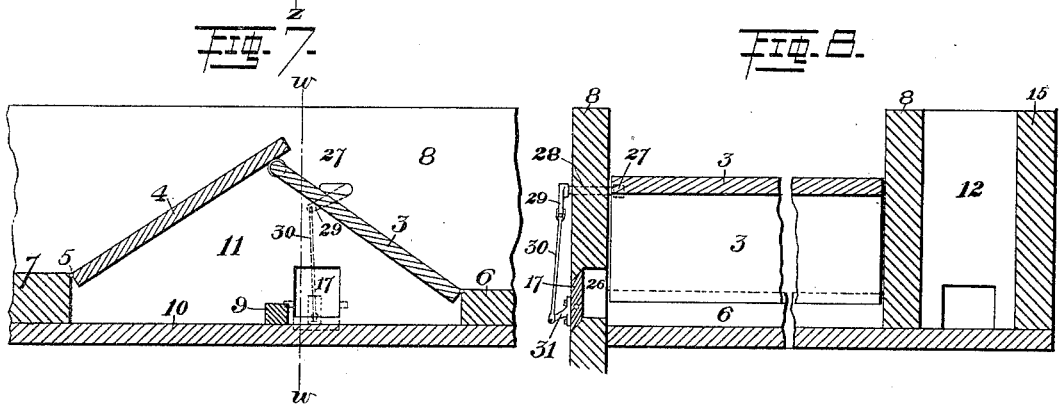
WITNESSES.
H. L. Gill
J. K. Smith
INVENTOR.
Arthur Kirk
by W. Bakewell & Sons
his Attorneys

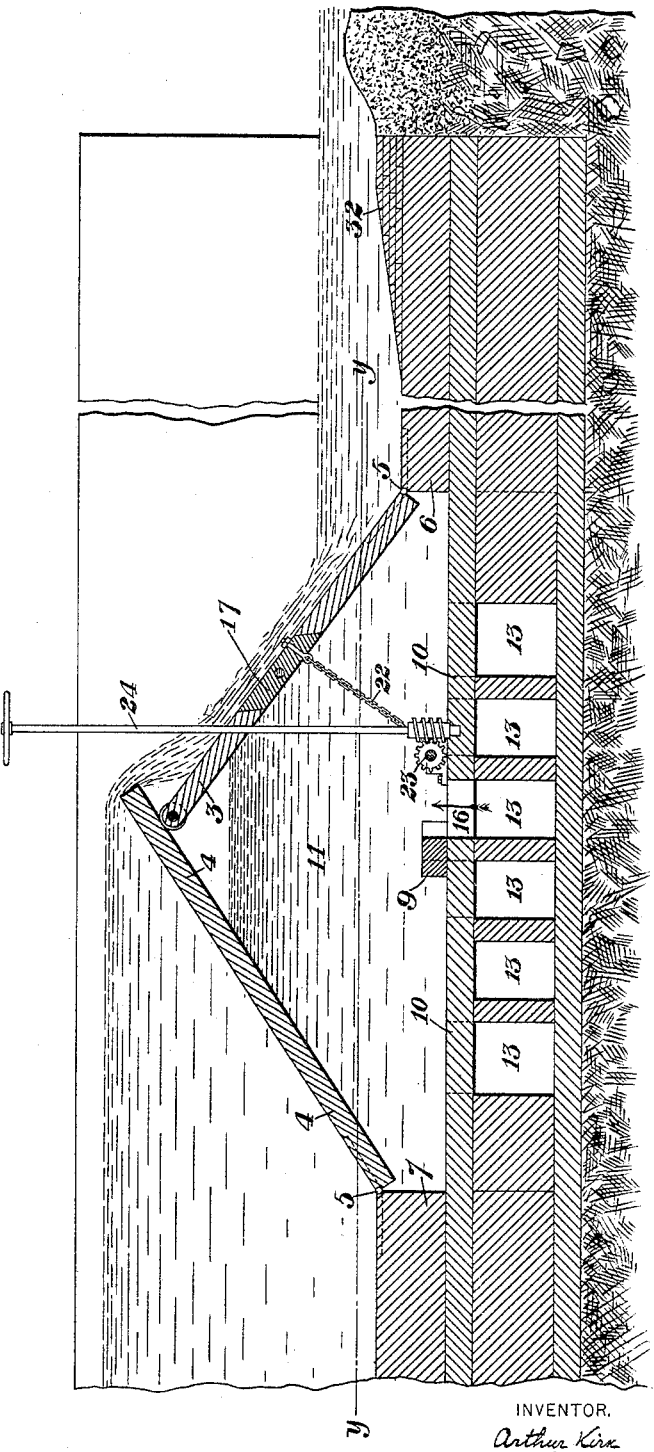

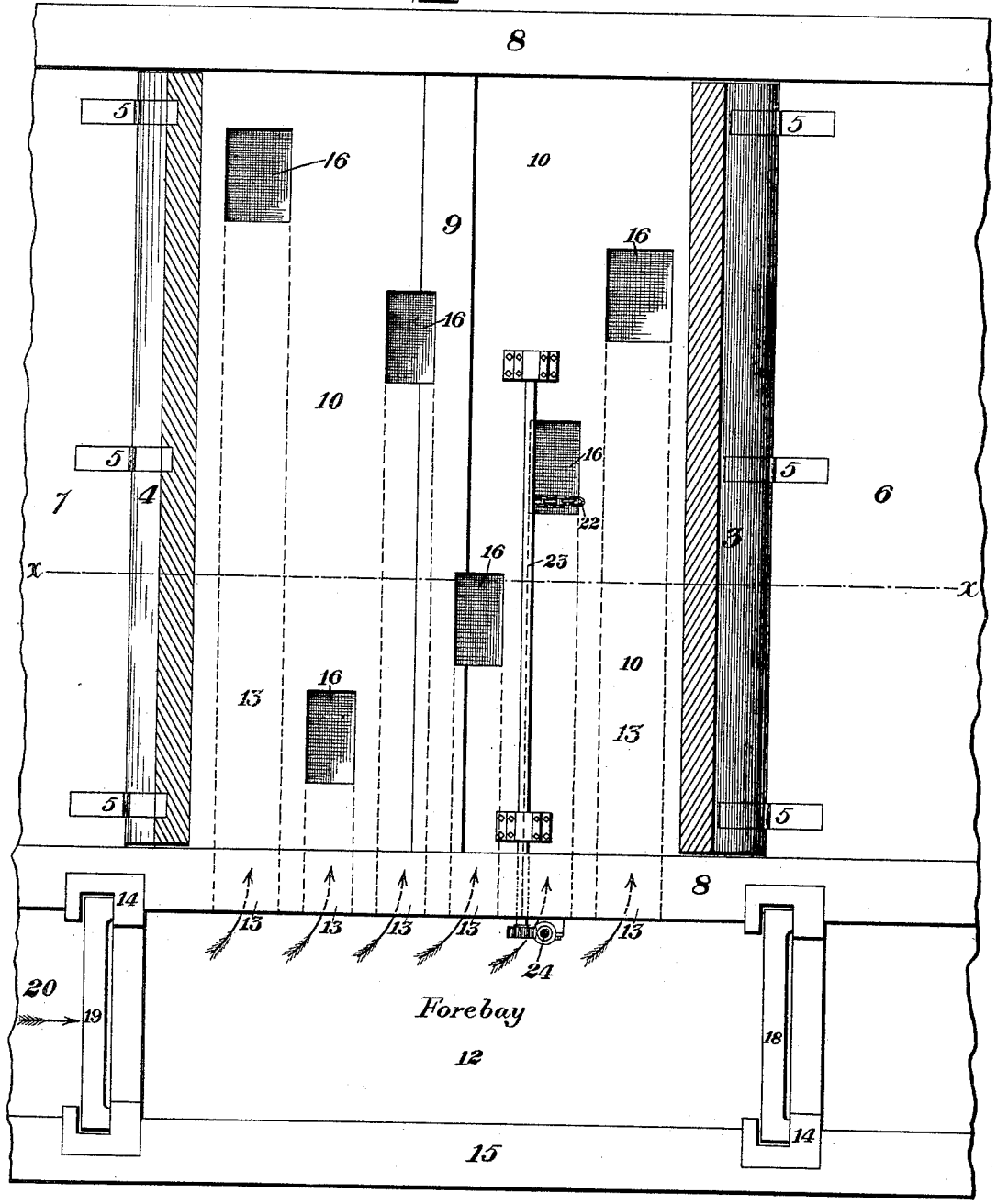

UNITED STATES PATENT OFFICE.

ARTHUR KIRK, OF SHARPSBURG, PENNSYLVANIA.

DAM.

SPECIFICATION forming part of Letters Patent No. 439,522, dated October 28, 1890.

Application filed March 2, 1888. Serial No. 265,976. (No model.)

*To all whom it may concern:*

Be it known that I, ARTHUR KIRK, of Sharpsburg, in the county of Allegheny and State of Pennsylvania, have invented a new and useful Improvement in Dams; and I do hereby declare the following to be a full, clear, and exact description thereof, reference being had to the accompanying drawings, forming part of this specification, in which—

Figure 1 is a vertical longitudinal section through the leaves of a bear-trap dam in an elevated position provided with my improvement, the section being on the line $x\,x$ of Fig. 2. Fig. 2 is a plan view of the dam, showing the leaves in horizontal section on the line $y\,y$ of Fig. 1. Fig. 3 is a vertical longitudinal section of the leaves when down, the section-plane being the same as that of Fig. 1. Figs. 4, 5, and 7 are vertical sectional views of the dam on a smaller scale, illustrating different modifications of the relieving device which I employ for allowing the water to escape from under the gates when the hydrostatic pressure has reached a dangerous limit. Fig. 6 is a vertical cross-section on the line $z\,z$ of Fig. 5. Fig. 8 is a vertical cross-section on the line $w\,w$ of Fig. 7.

Like symbols of reference indicate like parts in each.

Referring now to Figs. 1 and 2, 3 and 4 are the leaves of a bear-trap dam, which are hinged at their bases at 5 to foundation-walls 6 and 7 on the bed of the stream. The leaves are set in a chute between parallel side walls 8, with their bases at such distance from each other that when the leaves are lowered to a horizontal position the leaf 4 may overlap the other, as shown in Fig. 3, and that they may be raised by hydrostatic pressure into the inverted-V shape shown in Fig. 1.

9 is a cross-timber set on the dam-floor 10 within the chamber 11 under the leaves, and is designed to support the lower leaf 3 when it is horizontal.

12 is a forebay or well made adjacent to one of the walls 8 and communicating with the chamber 11 by ports or openings 13, which communicate with a space or a series of channels under the floor of the chamber 11. The forebay has a wall 14 at each end and a side wall 15, which practically inclose it. The end walls are provided with ports, which establish communication between the forebay and the pool above the dam and between the forebay and the pool below it. These ports are closed and opened by gate-valves 18 and 19, each situate on the upper side of the end walls. There are a number of the ports 13, which lead separately from the forebay under the floor 10 and open vertically at various points 16 through this floor into the dam-chamber 11, as shown in Fig. 2.

The operation, which is on the well-known bear-trap system, is as follows: The upper transverse foundation-wall 7 forms a permanent wall of several inches across the stream and backs up the water above the dam higher than it is below. If it is desired to raise the dam the lower gate-valve 18 is closed and the upper valve 19 opened to admit the water from the upper pool 20 into the fore-bay, which then flows through the ports 13 into the chamber beneath the leaves and raises them somewhat by hydrostatic pressure. This backs up the water in the upper pool 20 and fills up the forebay with water, which, increasing in height, continues to raise the dam-leaves until they have risen to the position shown in Fig. 1. The water in the upper pool then rises to the level of the top of the leaf 4 and flows over it into the pool below.

I shall now describe the devices which I employ for controlling the dam and preventing dangerous and excessive pressure on the under side of the leaves, the object of this feature of my invention being the same as that of the devices which I show in my prior patent, No. 268,411, and which are claimed in the sixth claim thereof. After the leaves have been raised to the proper height, as shown in Fig. 1, any further admission of water under them would cause the lower leaf 3 to turn over from under the upper leaf and to wreck the dam, and if the leaf be restrained by cleats or chains the hydrostatic pressure tends to strain the leaf, causing it to buckle and injuring the hinge-connection with the foundation. This is a serious source of danger to bear-trap dams, especially in times of flood, and its prevention is essential to their successful operation. In the dam shown in my prior patent, No. 268,411, I prevented this by an elevated overflow communicating with the dam-chamber 11, above which overflow the water in the chamber cannot rise. In this application I show, and intend to claim, an outlet-port communicating with the dam-chamber and controlled by a valve whose operative mechanism is arranged relatively to the leaf, so that the rise of the leaf above a certain height will move this mechanism, so as to open the valve and permit the escape of water, thus preventing the pressure from reaching a dangerous limit, and therefore preventing the lower leaf from rising too high and being displaced. In the drawings I show various forms of this invention, intending to indicate thereby that the invention is not limited, strictly, to any particular form and location of the parts.

Referring now to Figs. 1, 2, and 3, a valve or gate 17 is hinged within a port in the leaf 3, the sides of the part and the edges of the valve being beveled, as shown, so as to provide a seat for the latter and to allow it to open only in the direction of the arrow. The valve 17 is hinged eccentrically, and when the chamber 11 is filled with water above the level of the valve the greater pressure will be on the lower part of the valve and will be sufficient to hold it very firmly to its seat. The valve 17 is fastened by an eye-bolt to a chain 22, the other end of which is secured to the base of the chamber 11, and it is evident that when the leaf 3 rises to the full length of the chain the tension of the latter will draw the valve open and will permit the water to escape from the chamber 11 into the pool below. The higher the rise of the leaves the wider will the valve be opened, and when the opening is large enough to permit the escape of as much water from the chamber 11 as that which enters it from the forebay the leaves will come to rest. If the leaves of the dam be allowed to fall so as to slacken the chain 22, the pressure of the water will immediately reclose the valve.

In Figs. 1 and 2 I have shown the chain 22, secured to a shaft 23, which is journaled at the base of the chamber 11. A shaft 24 extends from the top of the dam to the shaft 23, and is there provided with a worm which meshes with a pinion on the latter. By turning the shaft 24 the chain 22 may be lengthened or shortened, and if it be shortened it is clear that it will limit the ascent of the leaf 3 accordingly, while its lengthening will allow a greater movement of the leaf, for as soon as the chain is drawn taut by the motion of the dam the valve 17 will be opened and the consequent escape of the water will check the rise of the dam.

With the arrangement of the chain and valve above explained a considerable movement of the dam-leaf is necessary to produce opening of the valve, for the reason that the valve is so much nearer the center of motion than is the upper edge of the leaf. In order to secure prompt action of the valve, I have devised the modification shown in Fig. 4, in which the chain 22 leads from the valve to a sheave 25, and being passed around the latter is secured at the end to the leaf 3, near its upper edge. Thus arranged only a slight motion of the leaf will be necessary to open the valve.

In Figs. 5 and 6 I show another form of this invention, in which the outlet-valve while operated by the rise of the dam-leaf is not fitted in the leaf, as in the forms which I have just described. Here the valve 17 closes an outlet-port made in the end wall of the dam, or made in any other place so that it shall communicate with the dam-chamber, and the operative mechanism of the dam is connected with the leaf of the dam, so that when the leaf reaches the desired height the valve shall be opened, so as to permit the discharge of the water. Thus 26 is the outlet-port, in which the valve 17 is pivoted eccentrically, as shown, and the valve is connected with the leaf 3 by a chain 22, which passes around a sheave 25 on the floor of the dam. On the rise of the dam to the proper height the chain is tightened and the valve is opened, as shown in Fig. 6, to permit the outflow of the water, and when the leaf falls the water-pressure on the valve will close it. In Figs. 7 and 8 the valve is similarly arranged, but is worked by a system of levers not directly connected with the leaf, but engaged and moved thereby when the leaf reaches a certain elevation. 27 is a lever-arm projecting from a short shaft 28, which is journaled in the end wall of the dam, and on the outside has an arm 29, which, by a chain 30, is connected with an arm 31 on the valve 17. When the gate reaches the proper height, the leaf 3 engages the lever 27 and turns it so as to draw on the chain 30 and to open the valve.

Other forms of this feature of my invention will suggest themselves to the skilled mechanic; but I have shown sufficient to indicate the principle on which it is based. Its advantages will be appreciated by those skilled in the art. It is simple, easily constructed, not apt to get out of order, and is very reliable.

In Figs. 1, 2, and 3 I show a useful feature of my invention. It consists in a device for preventing the washing out of the base of the stream and the formation of the holes which are usual at the foot of a dam. The water runs from the leaf 3 onto the foundation 6, which, instead of being flat, is provided with an ascending incline 32. This obstructs the course of the water as it rushes from the dam and gives it an upward direction, thus causing it to spend its force in the air and preventing the washing out or scouring of the bed of the stream.

I claim—

1. The combination, with a movable dam which is raised by upward hydrostatic pressure beneath it, of an outlet port or opening communicating with the chamber beneath the dam and a valve controlling said outlet the operative mechanism of the valve being so arranged relatively to the movable dam that on the rise of the dam it shall act on and move the valve to cause the discharge of water, substantially as and for the purposes described.

2. The combination, with the leaf or gate of a bear-trap dam, of a valve arranged in the gate, and retaining mechanism connected to said valve and capable of opening the same when the leaf shall have moved a given distance, substantially as and for the purposes described.

3. The combination, with the leaf or gate of a bear-trap dam, of a valve and a chain connected to said valve and capable of opening the same when the leaf shall have moved to the extent of the chain, substantially as and for the purposes described.

4. The combination, with a movable dam, of a discharge-outlet and a valve pivoted eccentrically therein, whereby the water-pressure thereon shall tend to keep the valve to its seat, substantially as and for the purposes described.

5. The combination, with the leaf or gate of a bear-trap dam, of a valve, a chain connected to said valve and capable of opening the same when the leaf shall have moved to the extent of the chain, and a shaft whereby the length of the chain may be varied, substantially as and for the purposes described.

6. A dam having at its base an upwardly-inclined floor for the purpose of preventing the scouring out of the bed of the stream below the dam, substantially as and for the purposes described.

In testimony whereof I have hereunto set my hand this 1st day of March, A. D. 1888.

ARTHUR KIRK.

Witnesses:
W. B. CORWIN,
THOMAS W. BAKEWELL.